(12) United States Patent
Zawaideh et al.

(10) Patent No.: US 11,499,870 B2
(45) Date of Patent: Nov. 15, 2022

(54) IMAGING SPECTROPOLARIMETER

(71) Applicants: Mazen Zawaideh, Carlsbad, CA (US);
Chris Claypool, Carlsbad, CA (US);
Emad Zawaideh, Carlsbad, CA (US);
BRUKER NANO, INC., Santa Barbara, CA (US)

(72) Inventors: Mazen Zawaideh, Carlsbad, CA (US);
Chris Claypool, Carlsbad, CA (US);
Emad Zawaideh, Carlsbad, CA (US)

(73) Assignee: BRUKER NANO, INC., Santa Barbara, CA (US)

( * ) Notice: Subject to any disclaimer, the term of this patent is extended or adjusted under 35 U.S.C. 154(b) by 163 days.

(21) Appl. No.: 16/219,618

(22) Filed: Dec. 13, 2018

(65) Prior Publication Data

US 2020/0191657 A1 Jun. 18, 2020

Related U.S. Application Data

(63) Continuation-in-part of application No. 14/121,491, filed on Sep. 11, 2014, now abandoned.

(51) Int. Cl.
| | |
|---|---|
| *G01J 3/447* | (2006.01) |
| *H04N 13/243* | (2018.01) |
| *G02B 27/09* | (2006.01) |
| *G02B 5/30* | (2006.01) |
| *G01J 3/02* | (2006.01) |
| *G02B 27/28* | (2006.01) |
| *H04N 5/247* | (2006.01) |
| *G01J 4/02* | (2006.01) |

(52) U.S. Cl.
CPC ............ *G01J 3/447* (2013.01); *G01J 3/0224* (2013.01); *G01J 4/02* (2013.01); *G02B 5/3025* (2013.01); *G02B 27/0955* (2013.01); *G02B 27/283* (2013.01); *G02B 27/286* (2013.01); *H04N 5/247* (2013.01); *H04N 13/243* (2018.05)

(58) Field of Classification Search
CPC ...... G01J 3/447; G01J 3/42; G01J 3/36; G01J 3/3823; G01J 3/0224
See application file for complete search history.

(56) References Cited

U.S. PATENT DOCUMENTS

| | | | |
|---|---|---|---|
| 7,557,918 B1* | 7/2009 | Newman | G01J 3/02 356/369 |
| 2012/0183175 A1* | 7/2012 | Alouini | G01J 3/447 382/103 |
| 2015/0219497 A1* | 8/2015 | Johs | G01N 21/211 356/367 |

* cited by examiner

*Primary Examiner* — David P Porta
*Assistant Examiner* — Fani Polyzos Boosalis
(74) *Attorney, Agent, or Firm* — Quarles & Brady LLP; Yakov S. Sidorin

(57) ABSTRACT

An imaging spectropolarimeter for examining targets with polarized light, the spectropolarimeter including a light source adapted to produce polarized light directed at a target. Embodiments also include a three-camera camera system defining a three-camera camera axis with a first camera unit comprising a first analyzer set at 0°, a lens and a first multi-pixel sensor, a second camera unit comprising a second analyzer set at 45°, a lens and a second multi-pixel sensor, and a third camera unit comprising a third analyzer set at 90°, a lens and a third multi-pixel sensor. At least two beam splitters adapted to direct a portion of polarized light reflected from the target to each of the first, second and third camera units. Preferred systems include a processor adapted to produce polarimetric images of the target utilizing intensity information collected by the multi-pixel sensors.

10 Claims, 7 Drawing Sheets

PRIOR ART

IMAGING SPECTROPOLARIMETER

CROSS REFERENCE TO RELATED APPLICATIONS

This application is a continuation-in-part of Ser. No. 14/121,491 filed Sep. 11, 2014 and claims the benefit of Provisional Patent Application Ser. No. 61/876,354 filed Sep. 11, 2013.

FIELD OF THE INVENTION

The present invention relates to measurement systems and methods and in particular to such systems and methods for non-invasive imaging for biomedical diagnostics.

BACKGROUND OF THE INVENTION

Detecting and treating cancer remains one of the biggest challenges in modern medicine. Biopsy has been the standard for making definitive cancer diagnosis and refers to the medical removal of a tissue sample, followed by the analysis of thin slices of excised tissue under a microscope. In recent years optical techniques have received considerable attention for tissue diagnostics because these methods tend to be minimally or non-invasive, fast, and inexpensive. The term "optical biopsy" is commonly used to indicate a form of optical measurement to non-invasively perform a tissue diagnosis, in situ, in vivo, and in real time. The motivation is to guide and/or possibly eliminate the need for surgical removal of biopsy tissue samples by recording images of the tissue in question and attempting a diagnosis of the tissue based on the optical measurements. Additional motivation is the potential for reduced health care costs by minimizing histology, and in some cases, eliminating the need for the surgical environment required for acquiring biopsy samples. While the ultimate goal of these optical methods is to eliminate the need for removing tissue samples, an intermediate goal during early clinical phases of these optical technologies is to provide guidance in locating the optimum sites for biopsy. Additionally, optical methods can serve as an aid in surgical procedures by helping to identify tumor margins in real time. During the past couple of decades several optical methods have been investigated for tissue diagnostics including light scattering spectroscopy (See: N. Rajaram, T. H. Nguyen, and J. W. Tunnel, "Clinical instrument for spectral diagnosis of cutaneous malignancy," *Proc. SPIE* 6848, 68480R-1 (2008).), confocal microscopy (See: P. Daukantas, "Using optics to detect skin cancer," *Opt. Photon.* (*OPN*) Nov., 27-33 (2007), photo-acoustic microscopy (See: J. T. Oh, M. L. Li, H. F. Zhang, K. Maslov, G. Stoica, and L. V. Wang, "Three-dimensional imaging of skin melanoma in vivo by dual-wavelength photoacoustic microscopy," *J Biomed. Opt.* 11(3), 034032-1-034032-4 (2006).), optical coherence tomography (OCT) (See T. Gambichler, A. Orlikov, r. Vasa, G. Moussa, K. Hoffmann, M. Stucker, P. Altmeyer, and F. G. Bechara, "In vivo optical coherence tomography of basal cell carcinoma," *J. Dermatol. Sci.* 45, 167-173 (2007).), polarimetric imaging (See: S. L. Jacques, J. C. Ramella-Roman, and K. Lee, "Imaging skin pathology with polarized light," *J. Biomed. Opt.* 7(3), 329-340 (2002).), and spectropolarimetric imaging (See: S. G. Demos, H. B. Radousky, and R. R. Alfano, "Deep subsurface imaging in tissues using spectral and polarization filtering," *Opt. Express* 7(1), 23-28 (2000).) The spectropolarimetric imaging technique measures the polarization properties of a sample as a function of wavelength and can provide 2D images normally recognized as a picture by a human observer. Recent studies show that spectropolarimetric imaging can provide different and supplementary information with respect to standard intensity imaging (See: S. L. Jacques, et al., "Polarized light camera to guide surgical excision of skin cancers," *Proc. SPIE* 6842, 684201 (2008), and is a promising technique for the detection of human skin (See: I. Abdulhalim, et al., "Skin biomedical optical imaging system using dual-wavelength polarimetric control with liquid crystals," *J. Biomed. Opt.* 15(2), 026024 (2010).) and colon cancers (See: A. Pierangelo, et al., "Multispectral Mueller polarimetric imaging detecting residual cancer and cancer regression after neoadjuvant treatment for colorectal carcinomas," *J. Biomed. Opt.* 18(4), 046014 (2013).).

The primary physical quantities associated with an optical field are intensity, wavelength, coherence, and polarization. In general, spectral information provides information about the molecular makeup of the material, while polarization information provides information about surface features, shape, shading, and roughness (See: J. S. Tyo, et al., "Review of passive imaging polarimetry for remote sensing applications," *Appl. Opt.* 45(22), 5453-5469 (2006).) Polarization tends to provide information that is largely uncorrelated with spectral and intensity images. As a result, spectropolarimetric imaging can provide information about both the material make up and morphology of the sample. In addition, spectropolarimetric imaging measurements can provide enhanced visualization of superficial structures to allow for subsurface imaging (See: J. Chung, et al., "Use of polar decomposition for the diagnosis of oral precancer," *Appl. Opt.* 46(15), 3038-3044 (2007).). Because the absorption characteristics of tissue results in wavelength dependent penetration depth, multispectral polarimetric imaging allows different layers of the tissue sample to be imaged, ranging from 50 microns deep for UV wavelengths up to 1000 microns for the NIR.

The spectropolarimetric imaging method has several advantages over other optical methods for tissue diagnostics. With respect to confocal microscopy, OCT, and photoacoustic microscopy methods it is much faster and cheaper. In comparison to light scattering spectroscopy methods it provides a visualization of the tissue sample or lesion. And in comparison to polarimetric imaging, it has an additional degree of freedom by providing spectrally resolved images with improved image contrast due to different absorption and scattering characteristics of benign and malignant tissues.

The most common experimental configuration for a polarimetric imaging system is shown in FIG. 1. The two most common methods that define the state of the art for the polarimetric imaging technique are orthogonal state contrast polarimetric measurements and Mueller matrix measurements. In the orthogonal state contrast method, the camera is used to acquire two images. The first image collects light with the polarizer oriented to accept light parallel to the incident light ($I_{par}$), and the second image collects light with the polarizer oriented to accept light perpendicular to the incident light ($I_{per}$). The two images are used to create a third image called the orthogonal polarization image ($I_{pol}$) following the equation below.

$$I_{pol} = \frac{I_{par} - I_{per}}{I_{par} + I_{per}}$$

Although simple orthogonal state contrast polarimetric measurements produce images with better contrast and improved tissue imaging resolution compared to unpolarized intensity images, these orthogonal state images provide only a small portion of the polarimetric information content available, and are not sensitive to deeper regions of the tissue.

The Mueller matrix method for polarimetric imaging uses dual rotating polarizers according to the scheme devised by Azzam (See: R. M. Azzam and N. M. Bashara, *Ellipsometry and Polarized Light* (Elsevier, 1987).) and depicted in FIG. 1. FIG. 1 shows a basic imaging polarimeter system. For orthogonal state contrast measurements, the polarizer in front of the camera is oriented to select light that is either parallel or perpendicular to the incident light to yield two images that are then mathematically combined to yield an "orthogonal polarization" image. For Mueller matrix measurements, both polarizers are rotated independently to measure at least 16 images to create the 4×4 matrix for the sample. The addition of a color filter wheel after the light source allows polarimetry measurements at discreet wavelengths.

The 4×4 Mueller matrix mathematically relates how a sample affects the polarization vector of an incident light beam and can be used to describe the polarization properties of a sample. There are 16 degrees of freedom in the Mueller matrix and a minimum of 16 images are required to determine an arbitrary unknown sample matrix. Although the experimental Mueller matrix of a tissue sample contains information on retardance, diattenuation, and depolarization, this information is not readily apparent in the original 16 images and the experimental polarimetric images are difficult to interpret directly. In clear media with defined optical interfaces, electromagnetic theory with Maxwell's equations can be used for polarimetry analysis. However, tissue is a turbid medium with complex dielectric structures and this type of analysis is impractical and not currently feasible. Instead, the sample discriminating parameters are typically extracted using a variety of polar decomposition methods. Even with these decomposition methods, Mueller matrix image analysis still remains exceedingly complex for biological tissue samples.

There are several limitations to the current state of the art in addition to those outlined above. Current methods ignore specular reflection and measure scattered light only. There is a potential wealth of additional information content by collecting spectropolarimetric images in both specular and non-specular mode. Furthermore, multiple scattering in thick tissues leads to the depolarization of light, creating a large depolarized source of noise that hinders the detection of the small remaining information-carrying polarization signal. As a result, it is necessary to maximize measurement sensitivity in order to further enhance image resolution and contrast.

In order to perform tissue diagnostics in situ, in vivo, and in real time the polarization and wavelength must be scanned fast enough to prevent image blurring from unintentional movements. Fast data acquisition is very difficult to achieve when utilizing Mueller matrix methods with rotating polarizers for spectropolarimetric imaging. Finally, the system and method should have potential for compactness and miniaturization for minimizing cost and ease of use. This is especially critical in the context of endoscopically-guided procedures, in which compactness of the device is necessary to ensure ability to traverse narrow luminal diameters (e.g., respiratory or gastrointestinal tract).

What is needed is a better imaging spectrometer that is fast and easy to use with improved contrast and higher resolution imaging of tissue and its underlying structure.

SUMMARY OF THE INVENTION

The present invention provides a measurement system and method for fast spectropolarimetric imaging with improved contrast and higher resolution imaging of tissue and its underlying structure. Although the primary application is for non-invasive biomedical diagnostics, the invention could have applications in many fields of optical metrology ranging from remote sensing to industrial monitoring.

Preferred embodiments include an imaging spectropolarimeter for examining targets with polarized light, the spectropolarimeter including a polarized light source adapted to produce polarized light directed at a target. Embodiments also include a three-camera system defining a system axis with a first camera unit comprising a first analyzer set at 0°, a lens and a first multi-pixel sensor, a second camera unit comprising a second analyzer set at 45°, a lens and a second multi-pixel sensor, and a third camera unit comprising a third analyzer set at 90°, a lens and a third multi-pixel sensor. At least two beam splitters adapted to direct a portion of polarized light reflected from the target to each of the first, second and third camera units. Preferred systems include a processor adapted to produce polarimetric images of the target utilizing intensity information collected by the multi-pixel sensors.

In these preferred embodiments an imaging spectropolarimeter for examining a target with polarized light, the spectropolarimeter includes: a polarized light source adapted to produce polarized light directed at a target and reflected from the target to: a three-camera system comprising: (1) a first camera unit comprising a first analyzer set to define a 0° polarization direction of light reflected from the target, a lens and a first multi-pixel sensor, (2) a second camera unit comprising a second analyzer set at 45°, relative to the 0° polarization direction, a lens and a second multi-pixel sensor, (3) a third camera unit comprising a third analyzer set at 90°, relative to the 0° polarization direction a lens and a third multi-pixel sensor. The spectropolarimeter also includes at least two beam splitters adapted to direct a portion of polarized light reflected from the target to each of the first, second and third camera units, and a processor adapted to produce polarimetric images of the target utilizing intensity information collected by the first, second and third multi-pixel sensors. The polarized light source also comprises a filter wheel or equivalent adapted to define a desired spectral range and a polarizer set at 21° relative to the 0° polarization direction, and the intensity information collected by the first, second and third multi-pixel sensors is used by the processor to produce polarimetric images of the target.

Theoretical Design

A polarizer-sample-compensator-analyzer (PSCA) configuration providing basic possibilities for photometric measurements has been described previously by Azzam (See R. M. Azzam and N. M. Bashara, *Ellipsometry and Polarized Light* (Elsevier, 1987).)

The light intensities are measured for several properly chosen azimuths of the polarizer and analyzer. Since the analyzed state of polarization is independent of absolute intensities, one of them can be used as a reference for the measurement of relative values. Consequently, at least three independent intensities are required to determine the two real ellipsometric parameters Psi ($\varphi$) and Delta ($\Delta$) for a fixed azimuth at angle P, the intensity I(A) at angle A transmitted by the analyzer as:

$$I(A)=I(P)|rs|^2\cos^2 P(\tan^2\psi\,\cos^2 A+\tan^2 P\,\sin^2 A+2\tan\psi\,\cos\Delta\,\tan P\,\cos A\,\sin A)$$

where $\Delta=\Delta_{sample}-\delta_{compensator}$, and $\delta_{compensator}$ is the retardance of the compensator.

Taking the intensity for $A=\pi/2$ as the reference:

$$I(\pi/2)=I(P)|rs|^2\cos^2 P(\tan^2 P),$$

the ellipsometric angle $\psi$ is obtained from the relative intensity measured for $A=0$ is:

$$I(0)=I(P)|rs|^2\cos^2 P(\tan^2\psi)$$

where:

$$\tan\psi = |\tan P|\sqrt{I(0)/I\left(\frac{\pi}{2}\right)}$$

The third intensity can be measured for $A=\pi/4$ $$I(\pi/4)=\tfrac{1}{2}I(P)|rs|^2\cos^2 P(\tan^2\psi+\tan^2 P+2\tan\psi\,\cos\Delta\,\tan P)$$

This provides the following explicit result for the ellipsometric angle $\Delta$, $$\cos\Delta = \mathrm{sgn}(P)[2I(\pi/4)-I(0)-I(\pi/2)]/\left[2\sqrt{I(0)I\left(\frac{\pi}{2}\right)}\right]$$

The obvious limitation here is the impossibility of distinguishing the sign of $\Delta$, which is confined to an interval of $\pi$. The azimuth P of the polarizer is the disposable quantity in this scheme; it should be chosen properly to minimize measurement errors. The analysis of the uncertainties in $\psi$ and $\Delta$ in the following section suggests the favorable setting of $P\approx\psi$, for which $I(0)\approx I(\pi/2)$. In any case, the values of P close to either zero or $\pm\pi/2$ should be avoided, since they lead to a rapid loss of sensitivity. It should be emphasized that a possible polarization sensitivity of the detector has been neglected; if present, it can be measured and accounted for using a sample with known parameters, or straight-through operation with no sample.

Optimization

An analysis of the uncertainties in $\psi$ and $\Delta$ can be performed to optimize the operation of the proposed design. Using the well-known forms for the normalized Fourier coefficients $$I = I_0[(1-\cos 2P\cos 2\psi) + (\cos 2P - \cos 2\psi)\cos 2A + (\sin 2P\,\sin 2\psi\,\cos\Delta)\sin 2A]$$

$$\alpha = \frac{\cos 2P - \cos 2\Psi}{1-\cos 2P\cos 2\Psi}$$

$$\beta = \frac{\sin 2\Psi\,\cos\Delta\,\sin 2P}{1-\cos 2P\cos 2\Psi}$$

-continued $$\alpha = \frac{\tan^2\Psi - \tan^2 P}{\tan^2\Psi + \tan^2 P}$$

$$\beta = \frac{2\tan\Psi\,\cos\Delta\,\tan P}{\tan^2\Psi + \tan^2 P}$$

$$\tan\Psi = \sqrt{\frac{1+\alpha}{1-\alpha}}\,|\tan P|$$

$$\cos\Delta = \frac{\beta}{\sqrt{1-\alpha^2}}$$

where $\alpha$ and $\beta$ can be calculated from the experimentally measured intensities according to $$\alpha = \frac{I_0 - I_{90}}{I_0 + I_{90}}$$

$$\beta = 2\left(\frac{I_{45}}{I_0+I_{90}}\right) - 1$$

With the above expressions, it is now possible to investigate the uncertainties $\delta\psi$ and $\delta\Delta$ in $\psi$ and $\Delta$, respectively, as functions of the uncertainties of the Fourier coefficients. The uncertainties $\delta\psi$ and $\delta\Delta$ represent the fluctuations of $\psi$ and $\Delta$ about their ideal values.

$$\sec^2\Psi\frac{\partial\Psi}{\partial\alpha} = \frac{-\alpha}{(1-\alpha)^2}\sqrt{\frac{1-\alpha}{1+\alpha}}\,|\tan P|$$

$$\frac{\partial\Psi}{\partial\alpha} = 0 \text{ when } \alpha = 0$$

This suggests the favorable setting of $P\approx\psi$ for maximum sensitivity in $\psi$.

$$-\sin\Delta\frac{\partial\Delta}{\partial\beta} = \frac{1}{\sqrt{1-\alpha^2}}$$

Minimum variation of $$\frac{\partial\Delta}{\partial\beta}$$

at $\sin\Delta=1$

This suggests the favorable setting of the compensator (with retardance$\approx 90°$) to $0°$ for maximum sensitivity in $\Delta$.

DETAILED DESCRIPTION OF PREFERRED EMBODIMENTS

Figure 2:
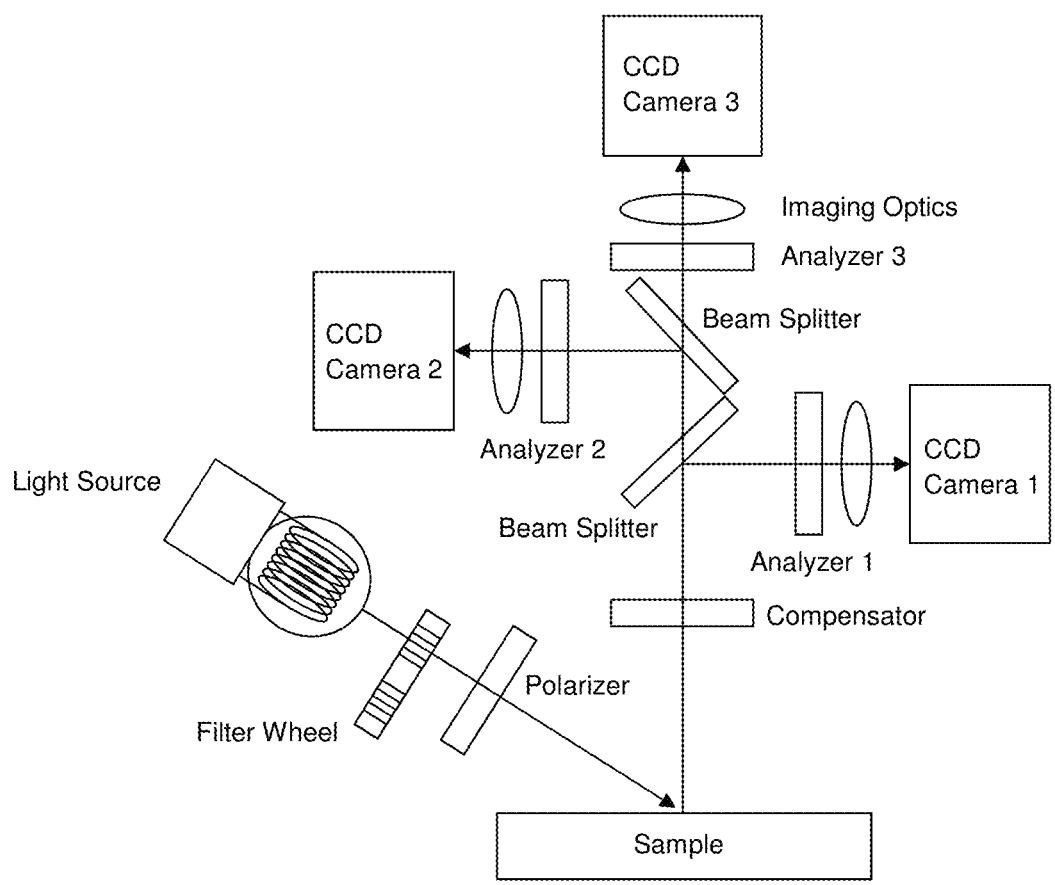
FIG. 2 shows a schematic of a first preferred spectropolaraimetric imaging apparatus.
Figure 3:
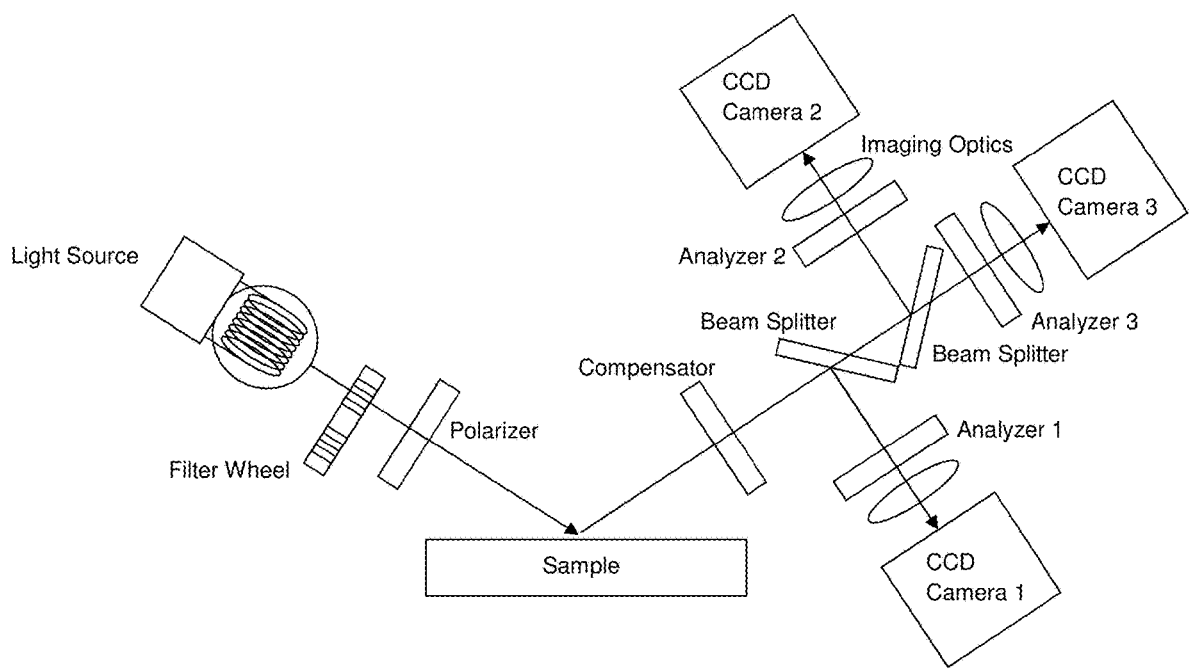
FIG. 3 shows a schematic of a second preferred spectropolaraimetric imaging apparatus.

From the theoretical design and optimization described above, several important factors are readily apparent for the preferred embodiments of the invention depicted in FIGS. 2 and 3.

FIG. 2 shows a schematic of a first preferred spectropolarimetric imaging apparatus for non-specular (scattered) reflection. A broadband light source supplies incident light from the UV to NIR while a filter wheel or equivalent allows the incident spectral range to be defined. The polarizer is set to 21° which gives the best sensitivity in Psi for biological tissue samples. The compensator is set to 0° to give the best sensitivity in Delta, while analyzer 1, analyzer 2, and analyzer 3 are set to 0°, 45°, and 90° respectively, relative to the incoming beams. The measurement apparatus allows the simultaneous collection of the three intensity images necessary to compute the Psi and Delta images of the sample as a function of incident wavelength.

FIG. 3 shows a schematic of a second preferred spectropolarimetric imaging apparatus in specular reflection mode. A broadband light source supplies incident light from the UV to NIR while a filter wheel or equivalent allows the incident spectral range to be defined. The polarizer is set to 21° which gives the best sensitivity in Psi for biological tissue samples. The compensator is set to 0° to give the best sensitivity in Delta, while analyzer 1, analyzer 2, and analyzer 3 are set to 0°, 45°, and 90° respectively, relative to the incoming beams. The measurement apparatus allows the simultaneous collection of the three intensity images necessary to compute the Psi and Delta images of the sample as a function of incident wavelength.

Figure 1:
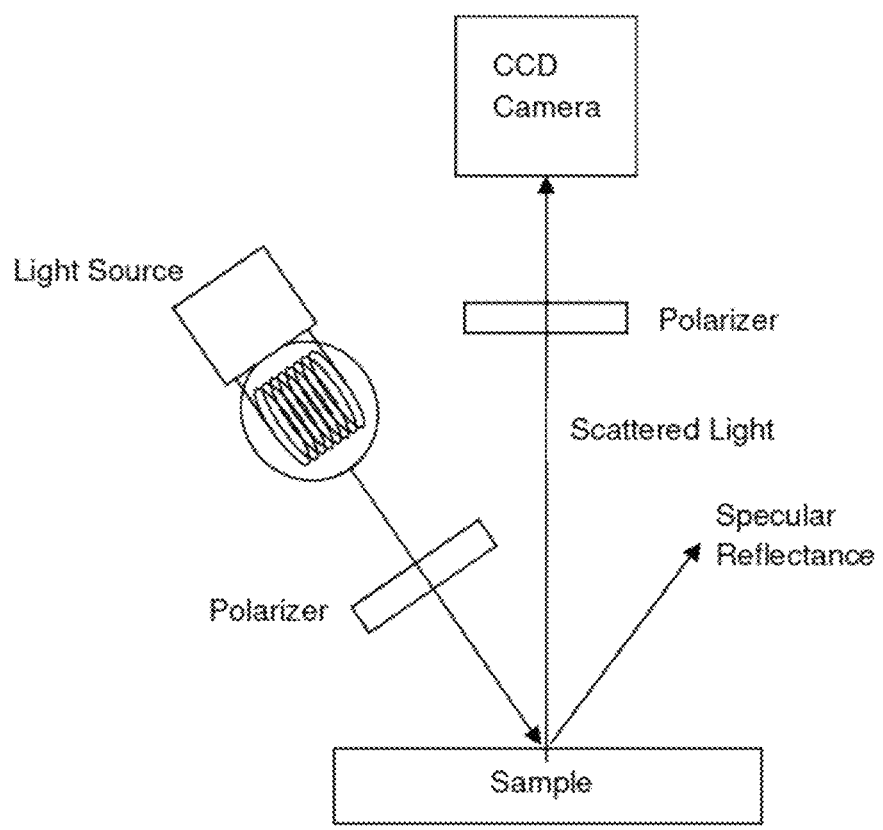
FIG. 1 shows a basic imaging polarimeter system.

First, only three intensity measurements are necessary to compute the ellipsometric parameters Psi and Delta ($\Psi$ and $\Delta$). A beam reflected from the target sample is split into three separate beams utilizing two beam splitters as shown in FIG. 1 and FIG. 3. For a practical imaging device, these three intensity images must be measured simultaneously. Second, the orientation of the compensator (retardance≈90°) is set to 0° relative to the camera axis while the three analyzers are set to 0°, 45°, and 90° relative to the incoming beam axis as shown in FIGS. 1 and 2. These configurations allow the determination of Psi and Delta with only three intensity images for either the specular or non-specular arrangements. As an additional benefit, the compensator setting of 0° also gives the best sensitivity for Delta. Third, the orientation of the polarizer (P) is set to the expected value of Psi for the sample in order to give the best sensitivity. Since the approximate value of Psi will be a known quantity for most materials, this optimum angle for the polarizer can be readily chosen. For example, the typical refractive index for biological tissue varies from ~1.4 to 1.5 (See: N. Ghosh and I. A. Vitkin, "Tissue polarimetry: concepts, challenges, applications, and outlook," J. Biomed. Opt. 16(11), 110801 (2011).) It follows that the ideal orientation of the polarizer for biological tissue samples will be P≈ψ≈21° relative to the propagation direction of the light for visible wavelengths. Fourth, multispectral polarimetric imaging will allow different tissue depths to be imaged and will provide improved image contrast due to different absorption and scattering characteristics of benign and malignant tissues. And finally, a variable detection arm angle will allow measurement of both non-specular (scattered) and specular reflectance.

The schematics shown in FIGS. 2 and 3 depict the spectropolarimetric imaging apparatus for non-specular (scattered) and specular reflection modes. The two measurement modes can be selected with a variable angle detector arm. A broadband light source supplies incident light from the UV to NIR while a filter wheel or equivalent allows the incident spectral range to be defined. The polarizer is set to 21° which gives the best sensitivity in Psi for biological tissue samples. The compensator is set to 0° to give the best sensitivity in Delta. Non-polarizing beam splitters are used to simultaneously image the sample in the same location with three CCD cameras. Each CCD camera has its own analyzer and imaging optics. Analyzer 1, analyzer 2, and analyzer 3 are set to 0°, 45°, and 90° respectively which allows the simultaneous collection of the three intensity images necessary to compute the Psi and Delta images of the sample as a function of incident wavelength.

One of the advantages of using this polarizer-compensator-sample-analyzer (PCSA) design in ellipsometric measurements is that rotating the compensator element improves the signal to noise in the measurement when compared to a rotating analyzer or polarizer design. It should be noted that in the proposed imaging polarimeter, the use of three imaging CCD detectors with fixed analyzer positions allows the integration time of each detector to be independently set and optimized. Not only does the use of independent CCD detectors greatly improve signal to noise, but this approach allows the removal of the compensator element if desired. Additionally, the polarizer and analyzer angles are fixed, and measurement noise due to polarizer, compensator, and analyzer movement uncertainties is eliminated.

The proposed spectropolarimetric imaging system requires precise alignment of the CCD cameras to avoid loss of ellipsometric image resolution. This can be accomplished mechanically and through software calibration. Precise pixel registration and calibration between the three CCD cameras can be accomplished by aligning to a patterned silicon wafer or equivalent. Additionally, the intensity and linearity of each CCD camera is calibrated using known reflection standards.

Preferred embodiment includes at least one processor adapted to convert pixel intensity data into the Alpha$^2$, Beta, tan(Psi), and cos(Delta) images referred to in this specification. These images preferably may be displayed on an almost real time basis for viewing by system operators. In some applications software can be provided to analyze the image information in an automatic inspection process.

To demonstrate the effectiveness of the imaging spectropolarimeter, NIST traceable thickness standards from VLSI Standards, Inc. (VLSI) were measured using the specular reflection mode described in FIG. 3. The NIST traceable thickness standards are comprised of a silicon wafer with a patterned thermal oxide of known thickness. The images were measured with illumination at 554 nm, incident sample angle=64°, polarizer angle=45°, and fixed analyzer angles of 0°, 45°, and 90°. Because the integration time was optimized for each CCD detector, the compensator element was not required for the measurements. Simulation and analysis of the measured Psi and Delta images was performed using SCI's FilmTek™ software, an optical thin film modeling package based on Abeles 2×2 matrix method (See: F. Abeles, "Research on the propagation of electromagnetic waves in stratified media—application to thin films," *Ann. Phys.* 5 (596), 1950; E. Zawaideh, "Nondestructive optical techniques for simultaneously measuring optical constants and thicknesses of single and multilayer films," U.S. Pat. No. 5,889,592, March 1999; and E. Zawaideh, "Nondestructive optical techniques for simultaneously measuring optical constants and thicknesses of single and multilayer films," U.S. Pat. No. 5,999,267, December 1999.)

Figure 4A:
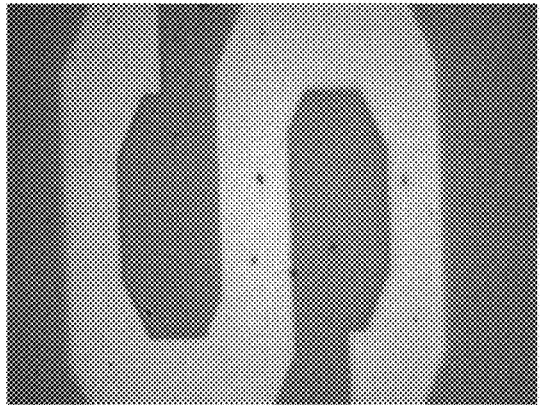
FIG. 4A shows the raw intensity image of a patterned region of an oxide thickness standard.
Figure 4B:
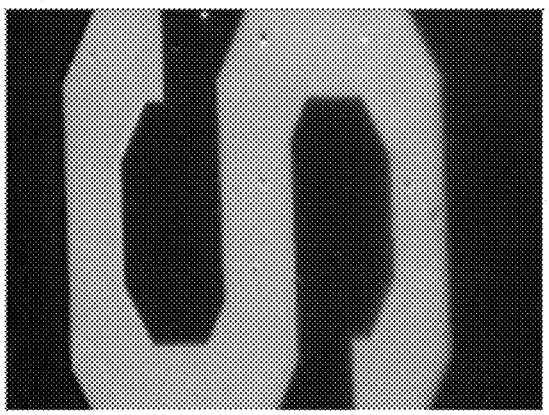
FIGS. 4B-4E show calculated Alpha$^2$, Beta, tan(Psi and cos(Delta) images.
Figure 4C:
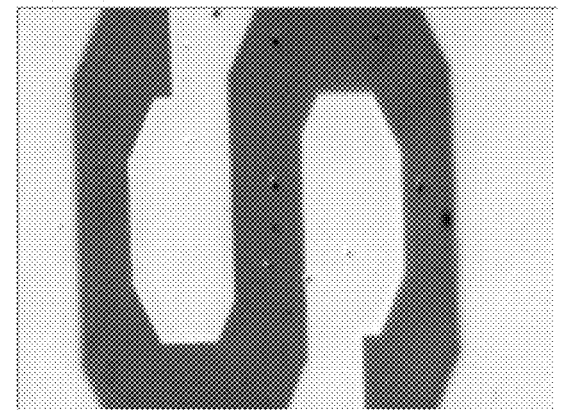
Figure 4D:
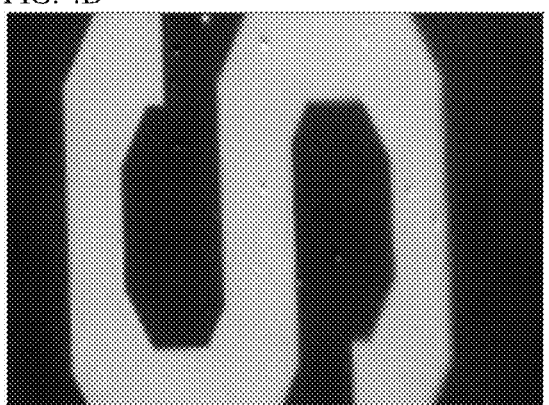
Figure 4E:
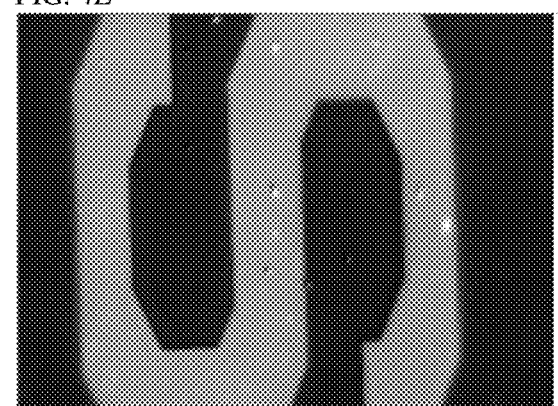

FIG. 4A shows the raw intensity image of a patterned region of the oxide thickness standard (analyzer=0°). The camera field of view is approximately 500×375 microns. The calculated Alpha$^2$, Beta, tan(Psi), and cos(Delta) images from the three intensity images are shown in FIGS. 4B-4E. Through etching, the oxide film has been patterned into the letter "S". In the area surrounding the letter "S", the oxide has been etched away to expose the silicon substrate. The film thickness is calculated from the measured tan(Psi) and cos(Delta) images using a single layer model with a fixed refractive index of 1.4604, and optical constants of the silicon substrate chosen to match the values used by the National Institute of Standards and Technology. Solving the measured Psi and Delta data for the image region comprising the letter "S" gives an oxide thickness of 524 Angstroms, which is in excellent agreement with the nominal value of 525 Angstroms reported for the standard. The remaining oxide thickness for the "bare" silicon region is calculated to be 82.8 Angstroms from the images, which is in good agreement with spectroscopic ellipsometric measurements of the sample using a calibrated instrument.

Figure 5A:
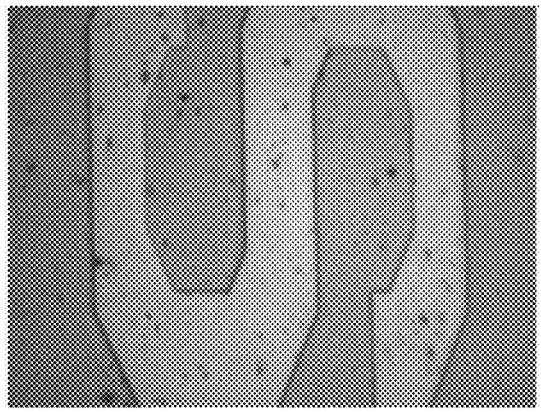
FIG. 5A shows a raw intensity of a patterned region of a different VLSI oxide thickness standard.
Figure 5B:
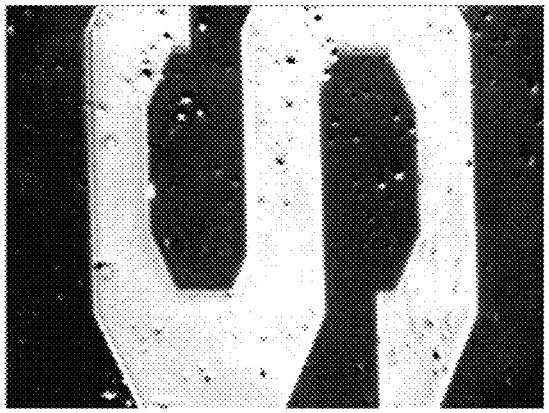
FIGS. 5B-5E show calculated Alpha$^2$, Beta, tan(Psi and cos(Delta) images.
Figure 5C:
Figure 5D:
Figure 5E:

Similarly, FIG. 5A shows the raw intensity image of a patterned region of a different VLSI oxide thickness standard (analyzer=0°). The calculated Alpha$^2$, Beta, tan(Psi), and cos(Delta) images from the three intensity images are shown in FIGS. 5B-5E. Solving the measured Psi and Delta data for the image region comprising the letter "S" gives an oxide thickness of 6920 Angstroms, which is in excellent agreement with the nominal value of 6915 Angstroms reported for the standard. The remaining oxide thickness for the "bare" silicon region is calculated to be 60.0 Angstroms from the images, which is in good agreement with spectroscopic ellipsometric measurements of the sample using a calibrated instrument. The measured oxide thicknesses obtained from the images of the patterned VLSI thickness standards demonstrates the quantitative sensitivity and accuracy of the invention. Although these patterned oxide samples can be visualized in the raw intensity image for a given polarization or unpolarized illumination, the oxide thicknesses cannot be determined from observation of the raw intensity image.

Figure 6A:
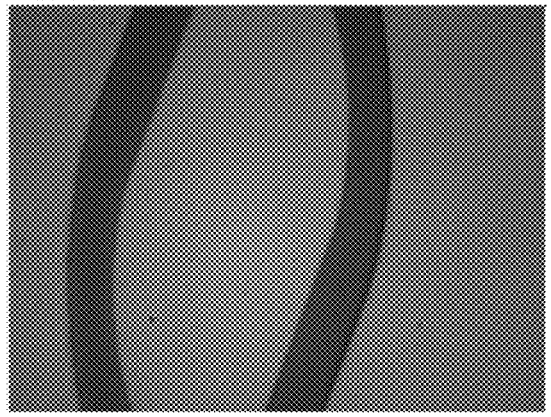
FIG. 6A shows the raw intensity image of a patterned region of an oxide thickness standard.
Figure 6B:
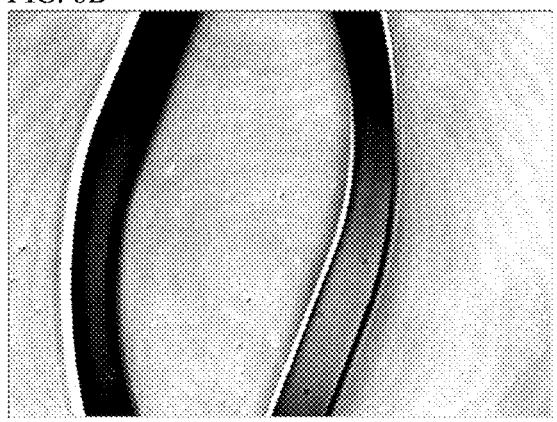
FIG. 6B-6E show calculated Alpha$^2$, Beta, tan(Psi and cos(Delta) images.
Figure 6C:
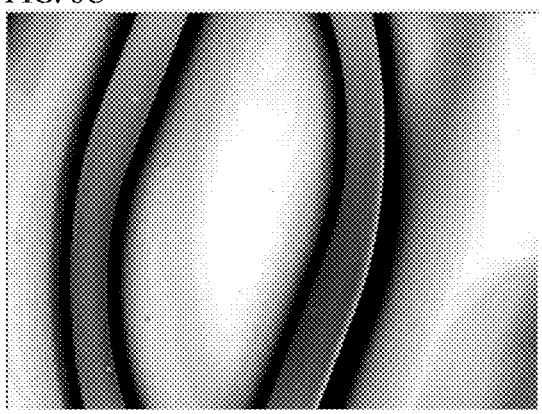
Figure 6D:
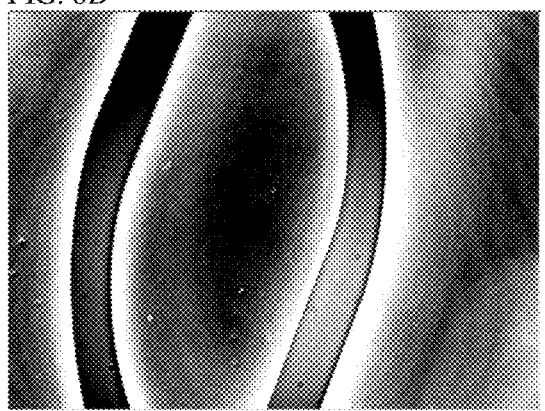
Figure 6E:
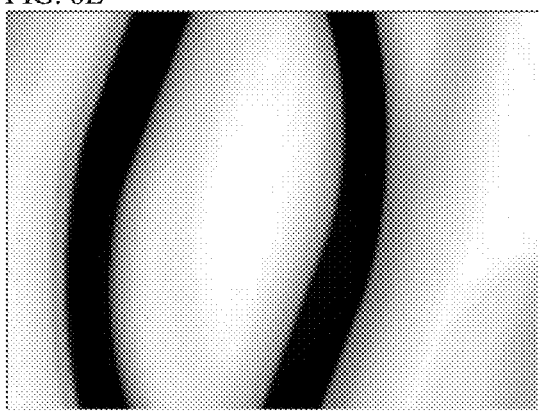
Figure 7A:
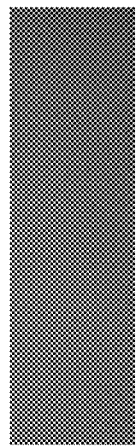
FIGS. 7A-7E show regions of particular interest
Figure 7B:
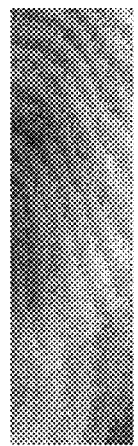
Figure 7C:
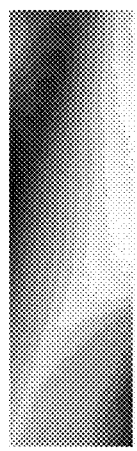
Figure 7D:
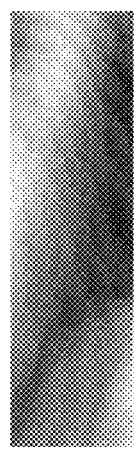
Figure 7E:
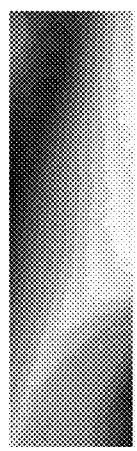

To demonstrate the capability of the invention to enhance contrast and resolve features not observable in a raw intensity image, a sample was imaged that contains a very small thickness gradient surround the pattern of interest. Similar to the VLSI thickness standards, the sample is comprised of a silicon wafer with a thermal oxide film. Patterned regions were obtained by etching away the oxide film. FIG. 6A shows the raw intensity image of a patterned region of the oxide sample (analyzer=0°). The calculated Alpha$^2$, Beta, tan(Psi), and cos(Delta) images from the three intensity images are shown in FIGS. 6B-6E. Solving the measured Psi and Delta data for the image region comprising the letter "O" gives an oxide thickness of 226 Angstroms. The average oxide thickness for the region surrounding the letter "O" is calculated to be 1262 Angstroms from the images. Of particular interest is the region adjacent to the patterned letter shown in FIGS. 7A-7E. The etching process has left a gradient in the remaining oxide thickness. Although this gradient is not observable in the raw intensity image (FIG. 7A), it can be easily seen in the calculated Alpha$^2$, Beta, tan(Psi), and cos(Delta) images (FIGS. 7B-7E). The measured oxide thickness ranges from 1267 to 1286 Angstroms. An oxide thickness gradient of 19 Angstroms is easily resolved in the image, and can be readily visualized without additional calculation by observing the tan(Psi) image (7*e*). These images clearly demonstrate the potential for resolving image features in the spectropolarimetric images that are not observable in a raw intensity image of the sample.

A key advantage of the invention is the ease of image interpretation. Unlike the Mueller matrix images, the measured Alpha$^2$, Beta, Psi and Delta images in combination with the raw intensity images can be viewed in real time by a physician and will not require further mathematical or computer analyses for interpretation. This is essential in the clinical setting where imaging-based management decisions are ideally made at the point-of-care. Furthermore, this is imperative in the setting of endoscopic procedures (e.g., colonoscopy) where a physician must make a decision to biopsy or not during the procedure. The present invention provides a measurement system and method for fast spectropolarimetric imaging for performing tissue diagnostics in situ, in, vivo, and in real time. The system design has the potential for compactness and miniaturization to allow for remote, hand held use. The real time output of ellipsometric Psi and Delta images provides additional information content for improved contrast and higher resolution imaging of tissue and its underlying structure for increased discrimination between benign and malignant tissues. Although the primary application is for non-invasive biomedical diagnostics, the invention could have applications in many fields of optical metrology ranging from remote sensing to industrial monitoring.

Variations

The above preferred embodiments are examples of embodiments of the present invention and are not to be considered as exclusive in any sense. Persons skilled in this art will recognize that many modifications and additions can be applied within the general concepts of the present invention including many of the features discussed in the documents cited in the Background section of this application. For example, targets could include an extremely wide variety of targets from tiny integrated circuits to battle field targets. The polarized light sources could include a white light source, a filter and a polarizer or one of many laser light sources. Many devices could be adapted to perform as intensity analyzers, including fixed grating linear CCD or 2D CCD detector arrays. The polarizer can be set at angles other than about 21° depending on the optical properties of the target, but normally the angle will be between 0 and 90 degrees. The present invention may be applied in a large variety of applications including the following applications:

1. Medical—e.g. cancer detection and screening.
2. Semiconductor—defect inspection, film thickness, and material characterization (surface roughness, refractive index, chemical composition).
3. Defense—remote sensing and enhanced imaging A variety of light sources could be used, for example: broadband, laser diode, LED, etc. A black and white (grayscale) CCD camera was described in the application for intensity measurement, but this could also be replaced with a color CCD camera in order to get spectroscopic intensity information (red, green, blue). In addition to CCD cameras, light intensity could be detected with fixed grating spectrometers with linear or 2D CCD arrays to give spectroscopic intensity measurements. The field of view of the system can be controlled with zoom lenses in front of the cameras. This allows the spatial resolution of the images to go down to micron resolution for semiconductor applications.

Therefore, the scope of the present application should be determined by the appended claims and their legal equivalence.

What is claimed is:

1. An imaging spectropolarimeter configured to examine a target with polarized light, the spectropolarimeter comprising:
   A) a polarized light source adapted to produce polarized light directed at a target and reflected from the target;
   B) a three-camera system comprising:
      1) a first camera unit comprising a first analyzer set to define a 0° polarization direction of light reflected from the target, a first lens, and a first multi pixel sensor,
      2) a second camera unit comprising a second analyzer set at 45°, relative to the 0° polarization direction, a second lens, and a second multi-pixel sensor,
      3) a third camera unit comprising a third analyzer set at 90°, relative to the 0° polarization direction, a third lens, and a third multi-pixel sensor;
   C) at least two beam splitters adapted to direct a portion of polarized light reflected from the target to each of the first, second, and third camera units, and
   D) a processor adapted to produce first second and third polarimetric images of the target utilizing light intensity information collected by the first, second, and third multi-pixel sensors,
   wherein the polarized light source also comprises a filter wheel adapted to define a desired spectral range and a polarizer set at 21° relative to the 0° polarization direction,
   wherein the light intensity information collected by the first, second, and third multi-pixel sensors is used by the processor to produce polarimetric images of the target, and
   wherein the spectropolarimeter is configured to acquire first, second, and third polarimetric images simultaneously.

2. The imaging spectropolarimeter as in claim 1, wherein the light source is comprised of a broadband light source and a filter wheel that allows spectral ranges of light incident thereon to be defined.

3. The imaging spectropolarimeter as in claim 1, wherein the three-camera system is adapted to monitor specular reflections of light from the target.

4. The imaging spectropolarimeter as in claim 1, wherein the three-camera system is adapted to monitor non-specular reflections of light from the target.

5. The imaging spectropolarimeter as in claim 1, wherein the first, second, and third cameras are CCD cameras.

6. The imaging spectropolarimeter as in claim 1, wherein the polarized light source is configured to supply said polarized light in a spectral range from ultraviolet to near infrared.

7. The imaging spectropolarimeter as in claim 1, wherein the light source is chosen from a group of light sources consisting of: broadband, a laser diode and an LED source.

8. The imaging spectropolarimeter as in claim 1, wherein each of the three camera units includes a color CCD camera.

9. The imaging spectropolarimeter as in claim 1, wherein the three-camera system includes a corresponding zoom lens in front of a respective camera to provide respective fields of view the cameras to be controlled to define a spatial resolution of images to be micron resolution.

10. The spectropolarimeter as in claim 1, wherein the processor is adapted to convert pixel intensity data received from the sensors into at least four sets of images for each sample being imaged.

* * * * *